Patented Apr. 10, 1951

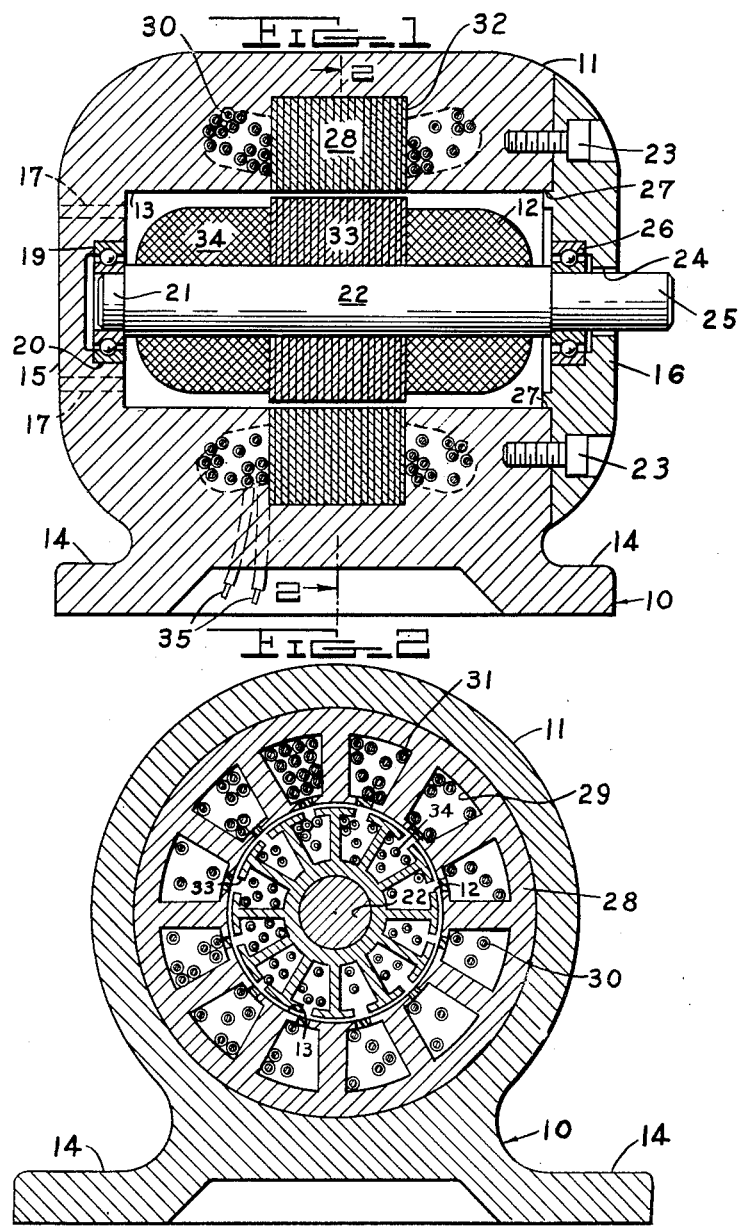

2,548,133

UNITED STATES PATENT OFFICE 2,548,133

CONSTRUCTION OF ELECTRIC MOTORS AND GENERATORS

Glenn H. Treat, Toledo, Ohio, assignor to Owens-Corning Fiberglas Corporation, a corporation of Delaware Application December 21, 1946, Serial No. 717,722

7 Claims. (Cl. 172—36)

This invention relates generally to electric motors, generators or similar devices and refers more particularly to the construction of the frames of such equipment.

Devices of the above general type are usually provided with a stator core suitably slotted or otherwise formed to accommodate the stator coils and with a rotor supported for rotation within the field created by the stator coils. The stator core is ordinarily carried by a frame having provision for rotatably supporting the rotor in proper relationship to the stator and composed of a plurality of sections bolted or otherwise removably secured together.

It has been the practice to form the various sections of the supporting frame by casting operations and to machine the castings to close tolerances in order to assure proper fitting of the sections during assembly. These machining operations require considerable time and add greatly to the cost of the device. Moreover, frames fabricated in accordance with this above practice usually have irregular surfaces and projections therein including the coil ends projecting from the stator core which collect dust, dirt or other foreign matter carried into the frame by the air circulating through the latter. Thus, when the device is used in a dust laden atmosphere, frequent cleaning is necessary to assure continued operation.

An object of this invention is to overcome the above objections by providing a motor or generator having a frame of monolithic construction having a smooth interior surface surrounding the rotor. The stator core, together with the coils thereof, is substantially completely embedded in the frame. Thus, the number of separable parts of the device is considerably reduced and almost all of the costly machining operations required in producing prior devices may be eliminated. Moreover, by casting the stator core and coils in the frame, it is possible to eliminate most if not all of the dust collecting projections or irregularities present in conventional motors or generators where the stator is merely secured to the inner surface of the frame. Also the stator coils are protected from dirt, moisture, oil, and foreign matter entering the motor frame. As a result, it is not essential to apply protective coatings such as electrical varnish to the insulation on the stator coils, and short circuiting caused by insulation failure is materially reduced.

Another object of this invention, which renders the above construction highly practical, is to insulate the electrical conductors forming the coils in a manner to resist the high temperatures reached by the coils due to their being completely enclosed within the frame and thus rendered incapable of losing heat to the atmosphere. Toward this end fibrous glass material such, for example, as glass fiber tapes, yarns or other forms of glass fibers, is wrapped around or otherwise applied to cover the electrical conductors or wires. An insulation formed of glass fibers will not only withstand the high operating temperatures resulting from embedding the coils in the cast frame, but in addition, permits casting about the coil frames of metals melting at temperatures in the neighborhood of 1000° to 2000° F. without deleterious effect on the insulation.

The foregoing as well as other objects will be more fully hereinafter set forth, especially when considered in connection with the accompanying drawing, wherein:

Figure 1 is a semi-diagrammatic sectional view through an electrical equipment constructed in accordance with this invention; and Figure 2 is a cross-sectional view taken on the line 2—2 of Figure 1.

For the purpose of illustrating this invention, a motor or generator is shown diagrammatically in Figure 1 of the drawing as comprising a frame 10, a stator assembly 11 and a rotor assembly 12. The frame 10 is preferably of monolithic construction having a central opening 13 for receiving the rotor assembly 12 and having supporting feet 14 formed integral therewith at its bottom. Opposite ends of the opening 13 are closed by the end walls 15 and 16 respectively. In the interests of simplicity of manufacture, the wall 15 is formed integral with the frame, and may be formed with openings 17 to permit circulation of air through the opening 13 around the rotor assembly 12. A bearing 19 of any desired type is secured in a recess 20 formed in the inner side of the end wall 15 and provides a journal for one end 21 of the rotor shaft 22.

The end wall 16 is removably secured to the frame by bolts 23 and is formed with an opening 24 therethrough for receiving the end 25 of the rotor shaft 22. The wall 16 is recessed at the inner end of the opening 24 to support a bearing 26 for the end 25 of the rotor shaft. In order to permit readily positioning the end wall 16 relative to the frame 10, an annular seat 27 is formed on the inner side of the wall 16 in concentric relation to the opening 24 and having a diameter predetermined to engage the inner surface of the frame.

The stator assembly 11 comprises the usual laminated iron core 28 having the required number of slots 29 for accommodating coils 30 of electrical conductors 31. The core 28 is in the form of a laminated ring supported in an annular recess 32 formed in the inner surface of the frame intermediate the ends of the opening 13. The inner annular surface of the core may be flush with the walls of the central opening 13 of the frame. Thus, the interior of the device may be relatively free from projections or irregular surfaces on which dust, lint, grit, oil, and other foreign matter may collect. As shown in Figure 1 of the drawing, the coils 30 are actually embedded in the material from which the frame is formed and are sealed from oil, water, dirt, and foreign matter that may be carried into the motor by air circulating through the openings 17.

In practice the frame 10 is preferably cast from aluminum, brass, bronze, white metal, or plastics, e. g., phenol formaldehyde, melamine, polyester resins, and other thermosetting synthetic resins. The casting is preformed in conventional manner in the kind of mold ordinarily employed for the selected metal or resin. The stator assembly 11 is cast in the frame 10 by any one of a number of methods, as for example, by supporting the stator assembly on the core used to form the central opening 13 in the frame during the casting operation. In this way the stator coils are sealed in the frame and the coils are protected against oil and moisture while the interior of the frame is clear of any dust-catching projections. Thus, the likelihood of short circuiting of the stator coils due to insulation failure, and the possibility of trouble occasioned by collection of dust inside the motor frame, are materially reduced and uninterrupted service is prolonged.

The practicality of manufacturing a motor or generator in the manner described depends on preventing deterioration of the insulation on the stator coils during the periods when it is subjected to the heat of the metal or resin being cast thereabout. Also, the temperature of the totally enclosed coils may tend to rise during operation considerably above coil temperatures found in conventional motors, especially where the material from which the frame is cast has a low rate of heat transfer.

In order to prevent elevated temperatures from having a deleterious effect on the coils 30, the insulation covering the coils and the conductors of the coils is formed of fibrous glass. Ordinary fibrous glass, which safely withstands temperatures in the neighborhood of 1000° F. may be used in many cases but where higher temperatures are encountered the high temperature-resistant fibrous glass may be used. This will withstand temperatures up to about 1800° to 2000° F.

The fibrous glass may be in the form of tapes, slivers, yarns, or braided sleeving capable of being readily applied as a covering over the conductors of the coils and over the coils. After the insulated coils are made up, they may be impregnated with a suitable electrical varnish if the material from which the frame is to be formed can be cast at temperatures below the decomposition temperature of the varnish, as in the case of frames cast from thermo-setting resins. Use of varnish is not essential since the coils are actually sealed in the frame 10 against the atmosphere and moisture. Generally, however, the fibrous material on the conductors and covering the coils should be of somewhat greater thickness than in the case where insulating varnish is used, and the fibrous glass should be closely interwoven, interbraided, or closely sewed on the wire to prevent the fluid casting material from penetrating the insulation.

The rotor assembly 12 may be of ordinary construction, and in addition to the shaft 22, comprises a laminated iron core 33 suitably slotted to receive the rotor coils 34. The core 33 is fixed to the shaft 22 intermediate the ends of the latter and is positioned in concentric relation to the stator core 28 as is customary in electric motors of the type illustrated. Rotation of the rotor assembly is effected in the usual manner by energizing the stator coils 30 with the proper electrical energy and for this purpose suitable leads 35 are extended through the frame 10 of the equipment. Where a wound rotor, as illustrated, is employed, it may be enclosed in a casting that covers the coils, similarly to the stator. In place of a wound rotor, an ordinary squirrel cage rotor may be used, in which case, of course, no protection is needed for the rotor and nothing is gained by casting an enclosure about the rotor.

The present invention provides an electric motor or generator wherein the stator coils may be embedded or sealed in the frame casting and provides coil conductors insulated to withstand the casting temperatures reached in fashioning the frame. The interior of the frame is free from any projections that could catch dust or lint, so that the present construction is ideally suited for dusty locations, and the protection afforded the coils makes the present construction useful also in applications where electric motors are to be located in highly humid atmospheres, as in the interior of water tanks. It also provides a motor that will operate submerged in liquids such as water, oil, gasoline, and many other fluids, and in atmospheres containing gases that attack insulating materials, such as corrosive gases and some refrigerants, for example, Freon.

Various modifications may be made within the spirit of the invention and the scope of the claims.

I claim:

1. A device of the class described comprising a cast metal frame having an annular portion, a stator having an annular core cast in the annular portion with the inner surface of the core substantially flush with the inner surface of the annular portion and having coils of electrical conducting wire secured within the annular portion by having the metal of the frame cast around the coils, and fibrous glass insulating material covering the wire and spacing the windings of said coils from each other.

2. A device of the class described comprising a cast metal frame having an annular portion, a stator having an annular core cast in the annular portion with the inner surface of the core substantially flush with the inner surface of the annular portion and having slots, coils of electrical conducting wire arranged in the slots and secured in the annular frame portion by having the metal of the frame cast around the coils, fibrous glass insulating material covering the wire and spacing the windings of said coils from each other, and a rotor carrying coils and having a shaft journalled on the frame and positioned in the annular portion in operative relationship to the stator.

3. An electrical device comprising a structural part, an electrical conductor wound into a coil that is mounted on said structural part, said structural part being a casting that substantially completely encloses said coil, and fibrous glass insulation on said electrical conductor and spacing the windings of said conductor from each other in the coil.

4. An electrical device comprising a structural part, an electrical conductor wound into a coil having a plurality of superposed windings and that is mounted on said structural part, said structural part being a metal casting that substantially completely encloses said coil, and fibrous glass insulation covering said electrical conductor and spacing the windings of said conductor from each other in the coil.

5. An electrical device comprising a movable part and a stationary part, an electrical conductor wound into a coil having a plurality of superposed windings, a stator core mounted on said stationary part and surrounding said movable part, said coil being mounted on said core, said stationary part being a casting that substantially completely encloses and is integral about said coil and surrounds the outer periphery of said core, and an electrical insulation on the conductor and containing glass fibers capable of withstanding temperatures in excess of the casting temperature of the material from which said stationary part is made.

6. An electrical motor comprising a rotor and a stator, a stator core, an electrical conductor wound into a coil having a plurality of superposed windings, said coil being mounted on said stator core, said stator being a casting that substantially completely encloses and is integral about said coil and surrounds the outer periphery of said core, and an electrical insulating covering on the conductor and containing glass fibers capable of withstanding temperatures in excess of the casting temperature of the material from which said stator is made.

7. An electrical device comprising a one piece frame having a cylindrical opening centrally located therein, an electrical conductor wound into a coil having a plurality of superposed windings, said coil being mounted in said frame about said cylindrical opening, said frame being a metallic casting that substantially completely encloses said coil, and an electrical insulating covering on the conductor for spacing the windings of said coil from each other and containing glass fibers capable of withstanding temperatures in excess of the casting temperature of the metal from which said frame is made.

GLENN H. TREAT.

REFERENCES CITED

The following references are of record in the file of this patent:

UNITED STATES PATENTS

| Number | Name | Date |
|---|---|---|
| 1,440,952 | Apple | Jan. 2, 1923 |
| 1,908,101 | Apple | May 9, 1933 |
| 1,921,432 | Stallard | Aug. 8, 1933 |
| 2,133,183 | Baird et al. | Oct. 11, 1938 |

FOREIGN PATENTS

| Number | Country | Date |
|---|---|---|
| 463,015 | Great Britain | Mar. 19, 1937 |